US012699869B2

(12) United States Patent
Taman Onen et al.

(10) Patent No.: US 12,699,869 B2
(45) Date of Patent: Aug. 4, 2026

(54) CONTACTLESSLY ACTIVATED RFID TAG FOR TIRE

(71) Applicants: KORDSA TEKNIK TEKSTIL ANONIM SIRKETI, Kocaeli (TR); SES RFID SOLUTIONS GMBH, Duesseldorf (DE)

(72) Inventors: Ezgi Taman Onen, Kocaeli (TR); Ahmet Burak Ilgun, Kocaeli (TR); Bahadir Kaya, Kocaeli (TR); Mehmet Saadettin Fidan, Kocaeli (TR); Mehmet Ilker Yilmaz, Kocaeli (TR); Yu Cheng Lee, Taichung (TW); Ping Jung Chao, Taichung (TW); Martin Scattergood, Duesseldorf (DE)

(73) Assignees: KORDSA TEKNIK TEKSTIL ANONIM SIRKETI, Kocaeli (TR); SES RFID SOLUTIONS GMBH, Duesseldorf (DE)

( * ) Notice: Subject to any disclaimer, the term of this patent is extended or adjusted under 35 U.S.C. 154(b) by 31 days.

(21) Appl. No.: 18/881,754

(22) PCT Filed: Jun. 12, 2023

(86) PCT No.: PCT/TR2023/050554
§ 371 (c)(1),
(2) Date: Jan. 7, 2025

(87) PCT Pub. No.: WO2024/010551
PCT Pub. Date: Jan. 11, 2024

(65) Prior Publication Data
US 2025/0307590 A1      Oct. 2, 2025

(30) Foreign Application Priority Data
Jul. 7, 2022    (EP) .................................... 22183707

(51) Int. Cl.
*G06K 19/07* (2006.01)
*B60C 19/00* (2006.01)
(Continued)

(52) U.S. Cl.
CPC ........ *G06K 19/07764* (2013.01); *B60C 19/00* (2013.01); *G06K 19/0723* (2013.01); *H01Q 1/2241* (2013.01)

(58) Field of Classification Search
CPC .......... G06K 19/07764; G06K 19/0723; B60C 19/00; H01Q 1/2241
(Continued)

(56) References Cited

U.S. PATENT DOCUMENTS 7,102,499 B2    9/2006  Myatt
8,462,077 B2    6/2013  Sinnett et al.
(Continued)

FOREIGN PATENT DOCUMENTS

CN          216871230 U      7/2022
EP          2772873 A1       9/2014
(Continued)

*Primary Examiner* — Omar Casillashernandez
(74) *Attorney, Agent, or Firm* — Bayramoglu Law Offices LLC

(57) ABSTRACT

The provided is an electrical device having an antenna design for embedding electronic device during tire manufacturing to increase durability, fatigue performance and signal level. The electrical device includes an antenna having a suitable adhesive coating. The electrical device reduces operational process for tire manufacturing of RFID tag embedded tire by providing a ready to use tag which can be embedded within the tire without requiring further coating or other processing. Further, the rubber patching/layering process during preparation of the electrical device is eliminated.

20 Claims, 1 Drawing Sheet

(51) Int. Cl.
    *G06K 19/077*        (2006.01)
    *H01Q 1/22*         (2006.01)

(58) Field of Classification Search
    USPC ........................................................ 340/447
    See application file for complete search history.

(56)                 References Cited

U.S. PATENT DOCUMENTS

| | | | |
|---|---|---|---|
| 8,766,874 B2 | 7/2014 | Sinnett et al. | |
| 9,490,531 B2 | 11/2016 | Robert et al. | |
| 10,515,298 B2 | 12/2019 | Scattergood | |
| 11,152,684 B2 | 10/2021 | Destraves et al. | |
| 2005/0132790 A1* | 6/2005 | Starinshak | B60C 23/0493 |
| | | | 73/146 |
| 2006/0097870 A1 | 5/2006 | Choi et al. | |
| 2010/0164822 A1* | 7/2010 | Iwasaki | H01Q 1/3241 |
| | | | 343/788 |
| 2017/0184753 A1* | 6/2017 | Prakash | E21B 49/00 |
| 2021/0016614 A1* | 1/2021 | Fenkanyn | B60C 23/0493 |

FOREIGN PATENT DOCUMENTS

| | | | | |
|---|---|---|---|---|
| JP | 2020026593 A | 2/2020 | | |
| WO | WO-2019137644 A1 * | 7/2019 | ......... | B60C 23/0452 |
| WO | WO-2020170057 A1 * | 8/2020 | ........... | H01Q 9/0414 |
| WO | 2021191165 A1 | 9/2021 | | |

* cited by examiner

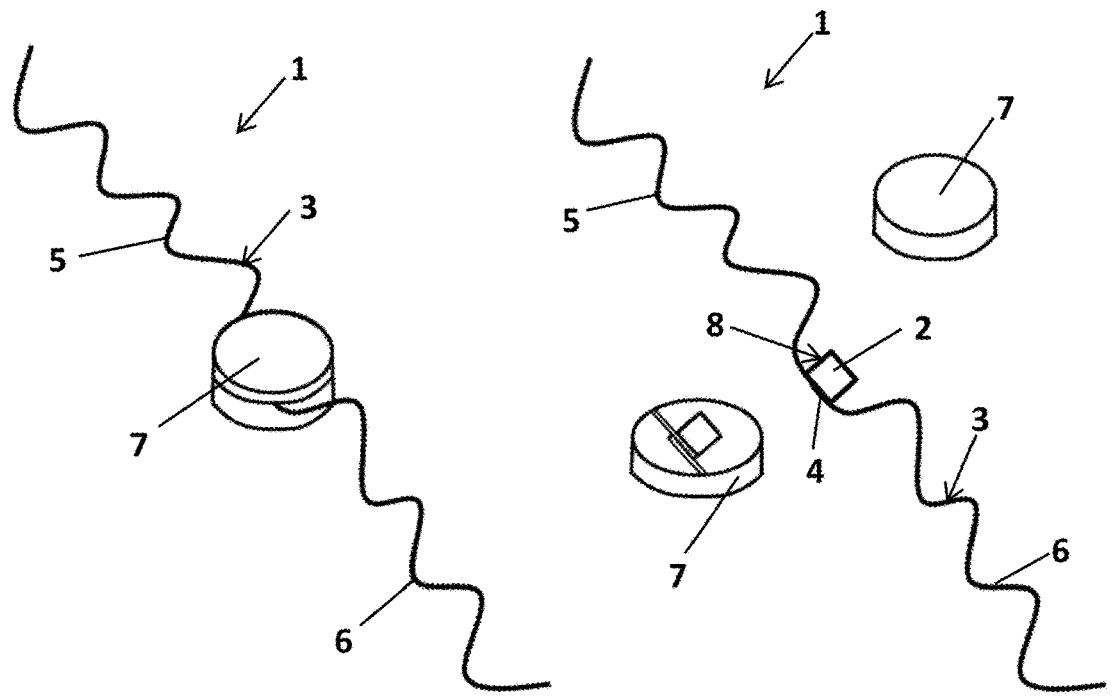
FIG. 1A             FIG. 1B
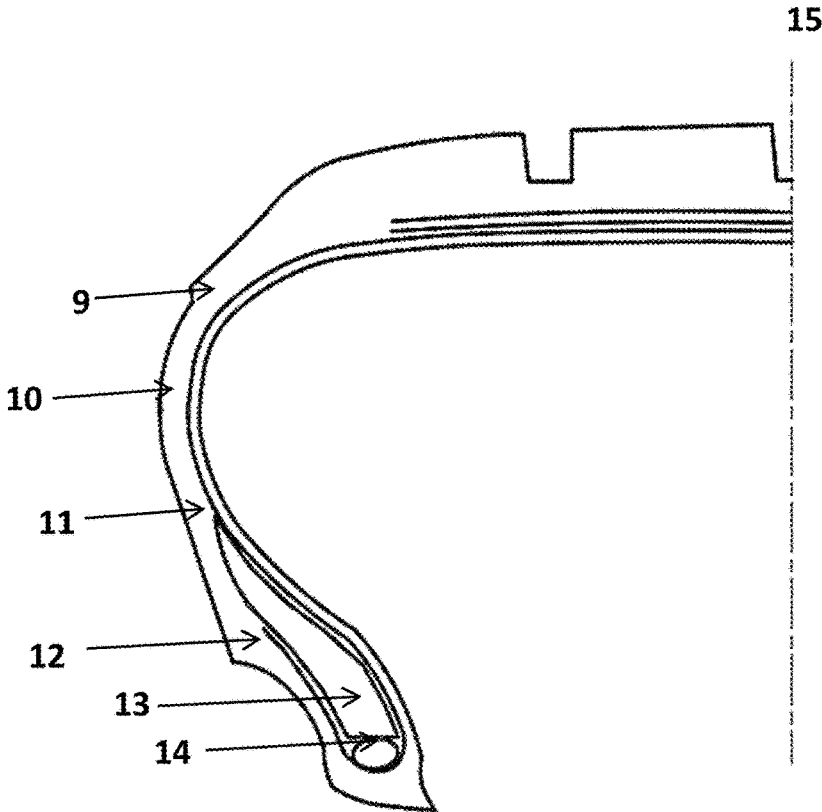
FIG. 2

CONTACTLESSLY ACTIVATED RFID TAG FOR TIRE

CROSS-REFERENCE TO THE RELATED APPLICATIONS

This application is the national phase entry of International Application No. PCT/TR2023/050554, filed on Jun. 12, 2023, which is based upon and claims priority to Turkish Patent Application No. 2022/011288, filed on Jul. 7, 2022; and European Patent Application No. 22183707.3, filed on Jul. 7, 2022, the entire contents of which are incorporated herein by reference.

TECHNICAL FIELD

The present invention relates to electrical devices for mounting onto tires. More specifically, the present invention relates to RFID tags for mounting onto tires and tires comprising such RFID tags.

BACKGROUND

It is known that incorporating electrical devices into tire structures has many advantages, such as tracking the tire during manufacture, transport and storing operations, as well as measuring physical parameters, such as temperature and pressure. Different types of electrical devices are used in the art for these purposes, with radio frequency communication between the tire and an external monitoring or interrogating device being the most common. Such communication systems often include a radio-frequency identification (RFID) tag, and a reader that communicates with the RFID tag. The RFID tag includes an antenna and an RFID chip. Thus, information from the reader is received through the antenna and stored in an RFID chip, and the information stored in the RFID chip is transmitted to the reader through the antenna. RFID devices may be read-only, write-only, or read-and-write devices.

RFID tags and other electrical devices may be mounted to a tire in a tire mountable apparatus. One of the problems associated with RFID tags is how to position and configure the antenna such that the data in the device are accurately transmitted to the information gathering device outside of the tire. The issues related to the use of RFID tags in tires are: (i) positioning the antenna as close to the outside of the tire as possible so that transmission efficiency is improved, (ii) positioning the antenna away from the metal reinforcing cords that interfere with the signal propagation, (iii) providing a device that can withstand the cyclic stresses in the operating tire, (iv) mounting the device onto the tire without overhandling and damaging it, and (v) ensuring the adhesion between the antenna, typically a metallic element, to the rubber material to secure it in place.

Examples of RFID tags for tires found in the state of the art are given below.

U.S. Pat. No. 7,102,499 discloses an electronic communication device for a tire having a radio device and an antenna intended to be attached to or embedded in a tire. The antenna is spirally or helically shaped to absorb tensile and bending stress applied by the tire. The antenna body may be a wire formed of spring steel, brass or zinc coated spring steel, or spring brass. A coating of insulating material coats the radio device and antenna for mounting on or in, and operation in, a tire structure.

U.S. Pat. Nos. 8,462,077 and 8,766,874 disclose an apparatus for providing an RFID device for integration into a tire.

A printed circuit board (PCB) is provided with notches in opposed ends of the PCB that are provided with guide portions as a part of the notches that function as threads to guide an end portion of a matching single pitch helical antenna into appropriately placed vias on the PCB. Threading of the helical antenna is assisted by use of an assembly jig having antenna guiding channels and PCB retaining positioning elements and antennas are bonded by soldering to solder pads on the PCB.

U.S. Pat. No. 9,490,531 discloses an antenna for an electronic device in a tire including a core for integrating into a rubber compound for a tire. The antenna further includes an electromagnetic-signal conduction layer, which is made of copper and coats the core, and a chemical isolation layer, which coats the conduction layer and is intended to chemically isolate the rubber compound from an object coated by the isolation layer.

U.S. Pat. No. 11,152,684 discloses a radiofrequency communication module for integrating into the structure of a tire. Said module comprises a radiofrequency transponder embedded in an elastomer blend and comprising an electronic chip and a radiating antenna that is able to communicate with a radiofrequency reader. The radiofrequency transponder in addition comprises a primary antenna that is electrically connected to the electronic chip, the primary antenna is electromagnetically coupled to the radiating antenna, the radiating antenna consists of a single-strand helical spring, and the radiating antenna has a core made of steel coated with a conduction layer.

The RFID tag must have long life during the entirety of the working life of the tire. In the prior art, the main technical problem lower durability due to soldered joint tag designs. In order to solve this problem, U.S. Pat. No. 10,515,298 discloses an RFID transponder having a chip and an antenna connected to the for contactless communication, which also includes a plastic package which accommodates these transponder components as integrated components. The plastic package forms a coil core on its outer surface, on which a booster antenna having at least one coil winding is arranged. The RFID transponder can be exposed to high mechanical stress and has improved performance due to the connection of a booster antenna.

SUMMARY

The present invention provides and improvement on the art by providing an antenna design for embedding electronic device during tire manufacturing to increase durability, fatigue performance and signal level. The electrical device of the invention comprises an antenna having a suitable adhesive coating. The electrical device of the present invention reduces operational process for tire manufacturing of RFID tag embedded tire by providing a ready to use tag which can be embedded within the tire without requiring further coating or other processing. Further, the present invention eliminates the rubber patching/layering process during preparation of the electrical device.

BRIEF DESCRIPTION OF THE DRAWINGS

Accompanying drawings are given solely for the purpose of exemplifying an electrical device, whose advantages over prior art were outlined above and will be explained in brief hereinafter.

The drawings are not meant to delimit the scope of protection as identified in the Claims, nor should they be referred to alone in an effort to interpret the scope identified in said Claims without recourse to the technical disclosure in the description of the present invention.

FIGS. 1A and 1B demonstrate a schematic closed (FIG. 1A) and exploded (FIG. 1B) view of an electrical device with an antenna according to the present invention.

FIG. 2 demonstrates a sectional view of a tire showing alternative placements for an electrical device with an antenna according to the present invention.

DETAILED DESCRIPTION OF THE EMBODIMENTS

FIGS. 1A and 1B illustrate an electrical device (1) according to the present invention. Said electrical device (1) can be an identification or tracking device, such as one that may be used in manufacturing, distribution, and sales activities, or a monitoring device for measuring temperature, pressure, or other physical parameters in an operating tire. In a preferred embodiment of the invention, said electrical device (1) is an RFID transponder comprising an RFID chip and an antenna in operable communication for wirelessly communicating with external equipment, such an RFID reader.

Said electrical device (1) comprises a plastic package (8) comprising a chip (not depicted) and an antenna (not depicted) which is connected to the chip for contactless communication. Said plastic package (8) accommodates these transponder components as integrated components and is able to accommodate larger microchips and longer coils for increased functional ranges. The material for said plastic package (8) may be selected based on the application. The plastic material should also include composites made up of curable resins.

Said plastic package (8) forms a bobbin (2) on its outer surface. An antenna coupling (3) having at least one coil winding (4) is arranged on the bobbin (2), wherein the coil winding (4) completely surrounds the integrated antenna of the chip in order to form a backscatter propagation coupling. The two ends (5 and 6) of the coil winding (4) form antenna wires of a dipole antenna for the UHF range.

The plastic package (8) and the at least one coil winding (4) are preferably integrated into a main housing (7). In a preferred embodiment of the invention, said main housing (7) is in the form of two cylinder-shaped halves which can be assembled.

The antenna (not depicted) which is connected to the chip and integrated into the plastic package (8) and the at least one coil winding (4) of the antenna coupling (3) preferably form conductor loops which are aligned with respect to one other. In a preferred embodiment of the invention, the bobbin (2) is arranged concentrically with respect to the antenna which is connected to the chip, and which is preferably configured as a winding coil. The chip is then also preferably arranged in the center of this winding coil.

Said plastic package (1) and the at least one coil winding (4) are fixed with respect to one another within said main housing (7), for example, using adhesive, welding, or other methods known in the art.

Preferably, the chip antenna is a flat coil having a winding plane that can be taken for aligning the antenna coupling (3) in order to form an optimal coupling between the chip antenna and the antenna coupling (3). A coil-shaped spring antenna, helical antenna, plate-shaped antenna, and various types of rod-shaped antennas can be used as the antenna coupling (3). In a preferred embodiment of the invention, said antenna coupling (3) is a helical antenna. In a more preferred embodiment of the invention, the helix angle between the antenna coupling (3) and the axial line is between 5° and 60°.

The antenna coupling (3) comprises a core material of wire, such as coated or uncoated and metal alloys. The antenna coupling (3) further comprises at least one reinforcement material co-twisted with or wrapped around said core material so that said antenna coupling (3) can endure the bending and flexing deformations typically experienced by the tire. In an alternative embodiment, antenna coupling (3) comprises a core material and two reinforcement materials.

Said at least one reinforcement material is chosen from among a group containing synthetic or biobased yarns or textile materials and metals. Said reinforcement material can be a dipped cord, greige cord or high strength polymeric reinforcement yarn. Said high strength polymeric reinforcement yarn may be made up of any polymeric material having a melting or thermal degradation point higher than 200° C. In a preferred embodiment of the invention, said reinforcement material is chosen from a group containing cotton, polyamide 6, polyamide 4,6, polyamide 5,6, polyamide 6,6, polyester (HMLS), UHMWPE (ultra-high molecular weight polyethylene) and combinations thereof. In a preferred embodiment of the invention, the tenacity of the high strength reinforcement yarn is at least 15 g/dtex and preferably higher than 20 g/dtex.

Said reinforcement material comprises a tacky component. Preferably, said reinforcement material is treated with a tackifying solution in order to improve the adhesion of the antenna coupling (3) to the rubber component of the tire. In a preferred embodiment of the invention, said reinforcement material is treated by dipping into a resorcinol formaldehyde latex (RFL) solution, as commonly used in the art. In alternative embodiments, resorcinol formaldehyde-free (RF-free) compositions, such as compositions containing acrylic resins or natural latex, can be used. In alternative embodiments, a rosin ester and/or rosin ester tackifier may be added to the dipping solution. However, the skilled person can appreciate that any method known in the art for improving the adhesion of components to rubber may be used in this application such that the antenna coupling (3) remains intact and adhered to or within the tire through the lifetime of the tire.

The electrical device (1) can be mounted directly onto uncured rubber of a tire before the curing process so that it is embedded among the layers comprising the final tire product. The tire types which can be equipped with the electrical device (1) include but are not limited to, bias tires, belted bias tires, radial tires, solid tires, semi-pneumatic tires, pneumatic tires, and airless tires. Generally, all tires include an outer tread, a bead which contacts a rim upon installation of the tire, and sidewalls that extend between the tread and bead. The method is advantageous in that it allows exact positioning of the electrical device (1) on the desired location and in a desired alignment on the tire without overhandling the electrical device (1) and causing damage.

It is most advantageous to place the electrical device (1) in positions on the tire that have minimum tensile and compressive strains during driving conditions. FIG. 2 illustrates alternative placements for an electrical device on a tire, wherein the circumferential direction of the tire is denoted by 15. Preferably, the electrical device (1) is mounted between the carcass layer and the outer rubber layer at upper (9), middle (10), or lower (11) sidewall area in the circumferential direction of tire. Good readability of the tag is obtained in these positions due to the thin gauge and the distance from the metallic components of the tire. In another embodiment of the invention, the electrical device (1) is mounted onto the bead area of the tire, including apex (12, 13) rubber and bead ring (14). The electrical device (1) may be mounted on the apex rubber or in the apex rubber in cases where the apex rubber is composed of two or more parts. These positions are advantageous due to reduced deformation in horizontal direction in driving conditions. In another embodiment of the invention, the electrical device (1) is mounted between the apex rubber and bead ring apex, wherein the electrical device (1) is mounted first on the upper side of the rubberized bead ring and the apex rubber is mounted onto the bead ring and the tag (1) This position is advantageous due to reduced deformation in all directions in driving conditions.

After electrical device (1) is mounted onto the uncured rubber, other elements of the tire, such as tire cords, are be added onto the uncured rubber, and tire is cured in order to get the final tire product having an electrical device (1), such as an RFID transponder. Thereafter, the tire can be identified by the use of an RFID reader, which allows for tracking the tire in a manufacturing or production system, monitoring the location of the tire, and performing inventory operations. A single tire may include one or several electrical devices (1) described herein. For example, if it is desired to monitor physical parameters at different locations in the tire or to monitor different parameters. The location for the device partially depends on its function.

The skilled person can appreciate that the electrical device (1) of the present invention can be used with other rubber or rubber-based articles in addition to tires. Other rubber-based articles include, but are not limited to, suspension components, cushions, shoe soles, hoses, hockey pucks, conveyor belts, musical mouth pieces and bowling balls.

In a nutshell, the present invention proposes an electronic device (1) comprising a chip and an antenna, a plastic package (8) wherein said chip and an antenna are integrated and wherein said plastic package forms a bobbin (2) on its outer surface, on which an antenna coupling (3) having at least one coil winding is arranged, and wherein said antenna coupling (3) comprises a core material and at least one reinforcement material co-twisted with or wrapped around said core material.

In one variation of the present invention, said at least one reinforcement material is chosen from among a group containing synthetic yarns, biobased yarns, synthetic textile materials, biobased textile materials and metals.

In a further variation of the present invention, said at least one reinforcement material is a dipped cord, greige cord or high strength polymeric reinforcement yarn.

In a further variation of the present invention, said high strength polymeric reinforcement yarn is made from a polymeric material having a melting or thermal degradation point higher than 200° C.

In a further variation of the present invention, said reinforcement material is chosen from a group containing cotton, nylon 6, nylon 4,6, nylon 5,6, nylon 6,6, polyester (ultra-high molecular weight polyester, high molecular weight polyester) and combinations thereof.

In a further variation of the present invention, wherein the tenacity of said high strength reinforcement yarn is higher than 15 g/dtex.

In a further variation of the present invention, wherein said reinforcement material comprises a tacky material.

In a further variation of the present invention, said reinforcement material is treated with a tackifying solution.

In a further variation of the present invention, said tackifying solution contains at least one material selected from the group comprised of resorcinol formaldehyde latex solution, acrylic resin solution, rosin ester solution, natural latex solution, and combinations thereof.

The present invention further proposes a tire having an electronic device (1) as described in any one of claims 1 to 9.

In a variation of the present invention, said electronic device (1) is mounted into a sidewall of the tire.

In a further variation of the present invention, said electronic device (1) is mounted into a bead area of the tire.

What is claimed is:

1. An electronic device comprising a chip, an antenna, and a plastic package, wherein the chip and the antenna are integrated and the plastic package forms a bobbin on an its outer surface of the plastic package, wherein an antenna coupling having at least one coil winding is arranged on the bobbin, and wherein the antenna coupling comprises a core material and at least one reinforcement material co-twisted with or wrapped around the core material.

2. The electronic device according to claim 1, wherein the said at least one reinforcement material is chosen from among a group comprising synthetic yarns, biobased yarns, synthetic textile materials, biobased textile materials and metals.

3. The electronic device according to claim 2, wherein the at least one reinforcement material is a dipped cord, greige cord or high strength polymeric reinforcement yarn.

4. The electronic device according to claim 3 wherein the high strength polymeric reinforcement yarn is made from a polymeric material having a melting or thermal degradation point higher than 200° C.

5. The electronic device according to claim 3, wherein the at least one reinforcement material is chosen from a group comprising cotton, nylon 6, nylon 4,6, nylon 5,6, nylon 6,6, polyester and combinations thereof, wherein the polyester comprises an ultra-high molecular weight polyester and a high molecular weight polyester.

6. The electronic device according to claim 3, wherein a tenacity of the high strength polymeric reinforcement yarn is higher than 15 g/dtex.

7. The electronic device according to claim 1, wherein the at least one reinforcement material comprises a tacky material.

8. The electronic device according to claim 7, wherein the at least one reinforcement material is treated with a tackifying solution.

9. The electronic device according to claim 8, wherein the tackifying solution comprises at least one material selected from the group consisting of resorcinol formaldehyde latex solution, acrylic resin solution, rosin ester solution, natural latex solution, and combinations thereof.

10. A tire having the electronic device according to claim 1.

11. The tire according to claim 10, wherein the electronic device is mounted into a sidewall of the tire.

12. The tire according to claim 10, wherein the electronic device is mounted into a bead area of the tire.

13. The electronic device according to claim 4, wherein the at least one reinforcement material is chosen from a group comprising cotton, nylon 6, nylon 4,6, nylon 5,6, nylon 6,6, polyester and combinations thereof, wherein the polyester comprises an ultra-high molecular weight polyester and a high molecular weight polyester.

14. The electronic device according to claim 4, wherein a tenacity of the high strength polymeric reinforcement yarn is higher than 15 g/dtex.

15. The electronic device according to claim 5, wherein a tenacity of the high strength polymeric reinforcement yarn is higher than 15 g/dtex.

16. The electronic device according to claim 2, wherein the at least one reinforcement material comprises a tacky material.

17. The electronic device according to claim 3, wherein the at least one reinforcement material comprises a tacky material.

18. The electronic device according to claim 4, wherein the at least one reinforcement material comprises a tacky material.

19. The electronic device according to claim 5, wherein the at least one reinforcement material comprises a tacky material.

20. The electronic device according to claim 6, wherein the at least one reinforcement material comprises a tacky material.

* * * * *